Nov. 7, 1939.   W. C. BUTTNER   2,179,144
EXCESS FLOW CHECK VALVE
Filed Aug. 7, 1937
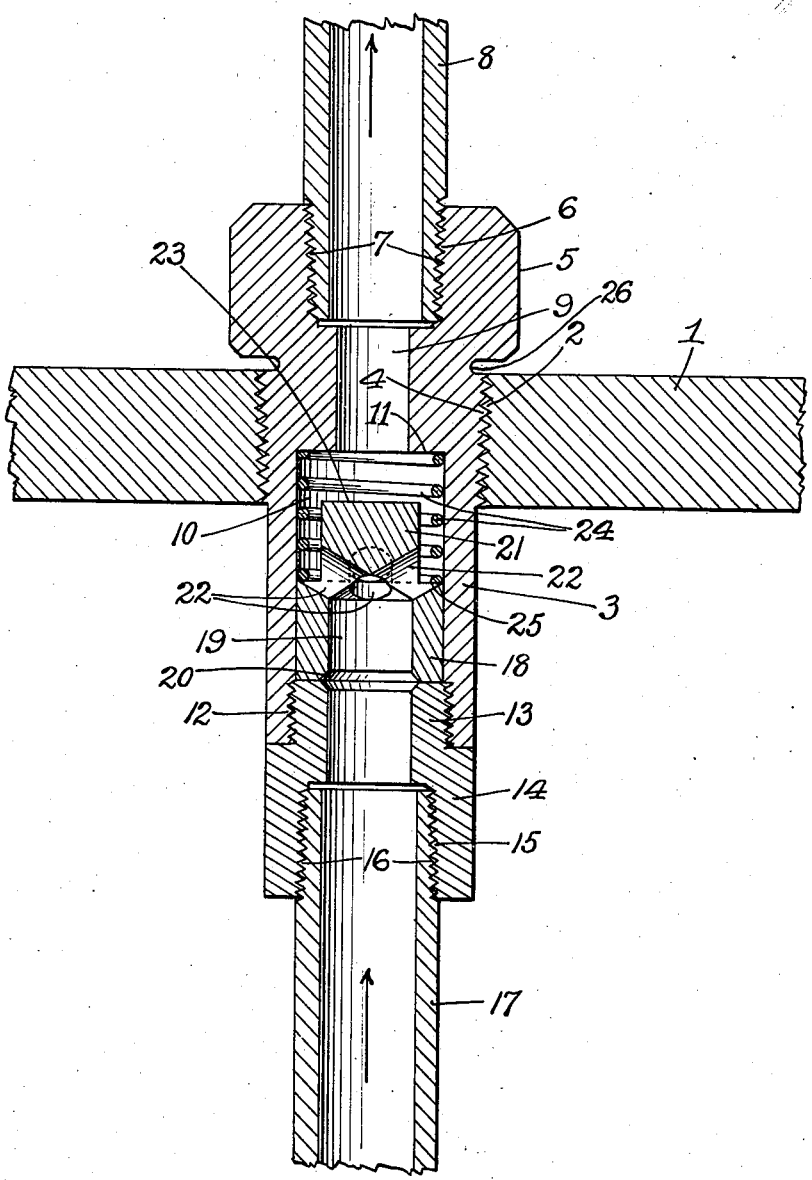
Inventor
William C. Buttner
by Parker & Carter
Attorneys.

Patented Nov. 7, 1939

2,179,144

UNITED STATES PATENT OFFICE 2,179,144

EXCESS FLOW CHECK VALVE

William C. Buttner, Winnetka, Ill., assignor to The Bastian-Blessing Co., Chicago, Ill., a corporation of Illinois Application August 7, 1937, Serial No. 157,915

1 Claim. (Cl. 137—153)

This invention relates to an excess flow check valve. In the present form it is designed primarily for association in a line through which fluid passes, for example, a gas line, and is intended to prevent flow of material through the line in excess of a predetermined maximum.

In its particular form it is designed for use in connection with a tank so arranged or constructed that the valve and its housing and assembly must be inserted from the outside. In many tanks which are provided with manholes, excess flow check valves may be inserted from the inside. In tanks which are smaller or which for some reason are not provided with manholes, the valve assembly must be inserted from outside the tank and this problem differs fundamentally from that in which a valve can be inserted from the inside.

One object of the invention is, therefore, to provide an excess flow check valve assembly which may be readily seated in a tank from the outside. Another is to provide in connection with such a valve a construction in which the valve parts, when the valve assembly is in position, are within the tank. A further object is to provide a construction in which the valve parts are so arranged within the tank that should breakage occur outside of the tank wall the valve will continue to operate satisfactorily and to prevent excess flow.

Other objects will appear from time to time in the specification and claim.

The invention is illustrated more or less diagrammatically in the figure which is a sectional view through the valve and a portion of the wall of a tank.

I indicates the wall of a tank which may be of any desired shape. Frequently such tanks are cylindrical and made of metal. The tank wall is preferably provided with a threaded perforation 2 within which the valve housing 3 which is correspondingly threaded at 4 is seated. A portion of the valve which remains exterior to the tank may be squared or otherwise shaped as at 5 to receive a tool by means of which it is put in place and removed. This portion has a cavity or passage which may be threaded as at 6 to receive the correspondingly threaded portion 7 of a pipe or conduit 8, through which gas or other fluid passes in the direction of the arrow to the point of use or discharge or storage. The valve housing 3 is provided with a preferably central bore 9 which is enlarged as at 10 to produce a shoulder 11. The enlargement 10 may be interiorly threaded as at 12 to receive the correspondingly threaded and preferably reduced portion 13 of a retainer 14 which is itself interiorly threaded as at 15 to receive the correspondingly threaded portion 16 of a pipe or conduit 17. This latter may be omitted or used, as conditions dictate. Frequently it is desirable to have such a conduit extend toward the bottom or lower portion of the tank.

18 is a valve member or slug which is preferably cylindrical in shape and provided with a bore 19 which may have a beveled lower edge or end 20. The valve member is provided with a preferably integral reduced portion 21 and perforations 22 which extend from the bore 19 to the exterior of the valve. There may be any desired number of these perforations. The reduced portion 21 is provided with a seating face 23, which, when the valve is closed, seats against the shoulder 11 formed in the interior enlargement 10 of the valve housing 3. The valve may be used as shown or may be given a particular seating shape and the shoulder 11, if desired, may have a specially shaped seat. As shown here both the shoulder and the seating face 23 of the valve are flat.

A compression spring 24 is positioned within the internal enlargement 10 of the bore 9 in the valve housing 3 and bears at one end upon the shoulder 11 and at the other end upon a shoulder 25 formed about the reduced portion 21 of the valve or slug 18.

As shown in the figure, the valve body 3 may be reduced as at 26, thus the groove or notch 26 is formed around the valve body to control breaking should any occur outside of the margin of the wall 1. If breakage occurs, it will occur about this notch or groove which defines a minimum section of the valve body and thus controls the location of the break and insures that if it occurs it will do so at a suitable location and one at which it will leave the remainder of the valve body and the valve mechanism in proper operating condition.

The use and operation of the invention are as follows:

The valve is so arranged and proportioned that it will ordinarily remain open when flow through it is not above a predetermined limit. When the flow exceeds the predetermined limit the valve or slug member 18 is raised from the position shown in the figure by pressure or friction or both, and moves against the resistance of the spring 24 and rises and is seated with its seating face 23 against the shoulder 11, thus shutting off flow through the valve.

The valve may operate satisfactorily in a variety of positions and is not limited to the vertical position here shown as a matter of convenience.

The valve assembly as a whole may be positioned so that the valve element 18 moves vertically up to close or vertically down to close or in any angular position with respect to the horizontal.

When the valve assembly is to be applied to a tank, it is positioned in a suitably prepared hole or opening in the tank wall which may be made at any time prior to the insertion of the valve assembly. The valve assembly is firmly secured, being usually screwed into place, and the desired connections are made so that material passing from the tank is conducted to the desired point. If flow becomes excessive, the valve closes in the manner above described.

Such valves are not only intended for pressure control in general operation, but are of prime importance as a safety means to prevent a discharge of gas or other fluid should breakage or damage occur somewhere in the system. Where the valve is applied to a fuel system, should breakage occur in the line, excess flow might follow and it is of prime importance, where breakage has occurred, to prevent this. For that reason the construction shown is arranged with all of the valve parts within the tank. They cannot be broken or their operation interfered with by breakage occurring anywhere beyond the tank walls. Even if the upper portion 5 of the valve housing 3 itself should be broken off short at the outer margin of the tank wall 1, the valve parts would not be destroyed and would remain in satisfactory operation, closing the valve instantly upon the occurrence of the excess flow which would take place at the same time as the breakage. The device thus comprises a combination of the valve and tank, so arranged that the valve is safeguarded and excess flow is prevented during normal operation or as a result of any breakage occurring outside the tank wall.

Where a tank wall has been spoken of its equivalent is to be included. The device might merely be a cover plate for a tank, or a tank closure and the invention is not limited to the placement of the valve in an opening in a member which forms a part of the enclosing wall of a tank.

I claim:

An excess flow valve assembly adapted for insertion through an aperture in a tank wall, and including a housing having a longitudinal uniform bore, a hollow valve plunger slidable in said bore, and including a guide portion conforming generally to said bore, said plunger having seating portions at each end thereof, the outer of said seating portions being solid, the inner of said seating portions having an aperture therethrough, said plunger having a communicating aperture extending from its hollow interior, and in communication with the interior of the cylindrical bore beyond the plunger, a fluid passage member adapted to have one end in communication with the interior of a tank and the other in communication with the interior of the cylindrical bore and aligned with the aperture of said last mentioned seat, said housing having a passage in its outer end in communication with said bore on the outer side of said plunger and circumferential seats for said passage and passage member, said solid plunger seat being adapted to close the passage in the outer end of the housing when the plunger is moved against the associated circumferential seat, yielding means adapted normally to hold said plunger in the opposite direction, said yielding means being of sufficient strength normally to hold said plunger with its apertured seat against the seat surrounding the passage member, with the interior of the plunger in communication with the passage in the outer end of the housing, but of insufficient strength to resist closing movement of said plunger in response to predetermined excess pressure within the tank.

WILLIAM C. BUTTNER.